(12) United States Patent
Nayak et al.

(10) Patent No.: US 8,190,903 B2
(45) Date of Patent: May 29, 2012

(54) METHOD AND APPARATUS FOR VERIFYING AUTHENTICITY OF DIGITAL DATA USING TRUSTED COMPUTING

(75) Inventors: Mithun Manjnath Nayak, Mumbai (IN); Chunduri Bhanu Teja, Hyderabad (IN)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 863 days.

(21) Appl. No.: 12/208,642

(22) Filed: Sep. 11, 2008

(65) Prior Publication Data
US 2009/0070589 A1    Mar. 12, 2009

(30) Foreign Application Priority Data

Sep. 12, 2007   (IN) ............................. 2039/CHE/2007

(51) Int. Cl.
*H04L 9/32*     (2006.01)
*G04F 11/30*    (2006.01)
*G06F 12/00*    (2006.01)
*G06F 11/00*    (2006.01)

(52) U.S. Cl. .......... 713/178; 713/176; 713/193; 726/22; 726/21

(58) Field of Classification Search .................. 713/178, 713/176, 193; 726/21, 22
See application file for complete search history.

(56) References Cited

U.S. PATENT DOCUMENTS

| | | | | |
|---|---|---|---|---|
| 6,269,446 | B1 * | 7/2001 | Schumacher et al. | 713/176 |
| 7,484,099 | B2 * | 1/2009 | Bade et al. | 713/176 |
| 2003/0120940 | A1 * | 6/2003 | Vataja | 713/193 |
| 2007/0266252 | A1 * | 11/2007 | Davis et al. | 713/176 |
| 2010/0100737 | A1 * | 4/2010 | Chapman | 713/168 |

* cited by examiner

*Primary Examiner* — Philip Lee
(74) *Attorney, Agent, or Firm* — Cha & Reiter, LLC

(57) ABSTRACT

A method and apparatus for authenticity and origin of Digital data such as recorded voice samples, video clips or still picture images etc. is provided. The method makes uses of the Trusted Computing principles to provide a secure, tamper detectable solution comprising of both software and hardware such that it can be verified without debate on its authenticity. The method comprises extracting reproduction avoidance key information and log information for captured data from stored information when verification of the captured data is requested, calculating reproduction avoidance key information using the extracted log information, comparing the extracted reproduction avoidance key information with the calculated reproduction avoidance key information and determining that the captured data has not been tampered, if the reproduction avoidance key informations are matched.

13 Claims, 7 Drawing Sheets

FIG. 4

| X | TS | Z | M |
|---|---|---|---|
| 253476453487355... | 13012007 12:35:46 +55E -45S | A$@@@I2123eedf... | ABBB6754343 99CD... |
| 4786735BDADCF... | 19012007 15:34:11 -45E +66N | A$@@@I2123eedf... | 198F6A7888B78888... |
| 213043B34A3328... | 31012007 01:56:32 -01E +70N | 1`00/@I2123eedf... | 667FFBCA88342452... |

METHOD AND APPARATUS FOR VERIFYING AUTHENTICITY OF DIGITAL DATA USING TRUSTED COMPUTING

CLAIM OF PRIORITY

This application claims the benefit of the earlier filing date, under 35 U.S.C. §119(a), to that patent application filed in Government of India Patent Office on Sep. 12, 2007 and assigned Serial No. 2039/CHE/2007, the entire disclosure of which is hereby incorporated by reference.

BACKGROUND OF THE INVENTION

1. Field of the Invention

The present invention relates to data authenticity and more particularly to a mechanism for improving the authenticity of digital data such as recorded voice samples, video clips or still picture images etc.

2. Background of the Invention

Authentic digital data is of interest to many cases. It could be provided, for example, as Digital Evidence in a Court of Law to strengthen a case or to a Content Vendor/Host that demands proof of the authenticity of digital data when a user uploads digital content to the Host site.

Digital Data can easily be modified or misused to accomplish malice. The trust component present in current day devices is primarily software based, hence it is almost impossible to detect tamper of digital data as software itself is easy to modify.

The Digital Video Authenticator (DVA) addresses law enforcement concerns for a means to authenticate digital video (DV) so that it will be admissible and trusted as evidence in court. The DVA is a peripheral device attached to a commercial digital video recording device whose purpose is to generate and record authentication data simultaneously as DV is recorded by the video recording device. Verification of the authenticity of a DV sample is then accomplished using non-real-time software tools. The DVA system and method reads digital video (DV) data from a digital video recording device, parses the DV data into elements representing video, audio, control and timing data and creates digital signatures that can be used to validate the original DV tape. The combination of secure digital signatures and repeatability of the DV data stored on tape provides the basis for proving the original video has not been modified.

A system for time-stamping a digital document containing, for example, alphanumeric, video, audio, or pictorial data, protects the secrecy of the document text and provides a tamper-proof time seal establishing an author's claim to the temporal existence of the document. Initially, the document may be condensed to a single number by means of a one-way hash function, thereby fixing a unique representation of the document text. The document representation is transmitted to an outside agency where the current time is added to form a receipt. The agency then certifies the receipt by adding and hashing the receipt data with the current record catenate certificate which itself is a number obtained as a result of the sequential hashing of each prior receipt with the extant catenate certificate. The certified receipt bearing the time data and the catenate certificate number is then returned to the author as evidence of the document's existence. In later proof of such existence, the certificate is authenticated by repeating the certification steps with the representation of the alleged document, the alleged time data, and the catenate certificate number appearing in the agency's records immediately prior to the certificate number in question. Only if the alleged document is identical to the original document will the original and repeat certificate numbers match.

A digital video authenticator achieves the same level of authentication using signatures and copies of the captured data. However it is a well known fact that software cannot be trusted since it is a very achievable task to modify software. Also the interface between the Capturing device and the DVA needs to be secured. Any malware (software from an untrusted vendor), residing on the capturing device can change the captured data and render it unfit for use as evidence in court. Accordingly an alternative for verifying the authenticity of Digital Data is needed.

SUMMARY OF THE INVENTION

In one aspect of the invention, an application, built on the Trusted Computing principles is disclosed that can prove that the data captured by the capturing device is authentic and non-tampered. Digital signature technology is just a piece of software that can help in the case where data that has been captured has not already been modified.

The invention uses the Trusted Computing principles to provide a secure, tamper detectable solution comprising both software and hardware such that there is no debate regarding the authenticity of documents or other media. In one aspect, the invention also time and space stamps the digital data using a secure time and location co-ordinate source (such as a GPS engine) in the process of capturing the digital data. Any/all peripheral devices (clock, GPS engine, voice recorder, camera, video recorder, cryptographic engine, DSP chip, storage memory chip) that reside on the main device (example Mobile phone) have been authenticated and checked for integrity at boot time (and also at pre-decided time intervals) by using the well known principle of Secure boot. Any peripheral device or program on the Main device functions in a 'trusted' manner, and all events related to the peripheral devices and the data captured are logged in a peripheral device log—which is stored on the storage area of the Main device. Also a hash of the entire data—after compression in the encoder—with the Time-Space-Stamp from the secure time and space device as key is calculated and stored in a pre-decided location of a non volatile (NV) memory inside the TPM. The peripheral device log maintains a list of the event details, the Time-Space-Stamp, the new addition to the measurement and the new result of the measurement.

New Measurement=HMAC$_{Time-Space-Stamp}$(Previous Measurement from NV||SHA1(New Digital Data)||PCR Value)

As the NV has limited memory, only one measurement is stored and the new measurements are added into the same address location in the NV memory.

In one aspect, an owner of the Main device can send the log to a verifier and undeniably prove that the captured data was authentic and not tampered along with the time and location it was captured.

BRIEF DESCRIPTION OF THE DRAWINGS

Embodiments of the present invention will be described below in connection with the attached drawings in which:

FIG. 4 illustrates a typical Peripheral Measurement Log;

Throughout the drawings, it should be noted that like reference numbers are used to depict the same or similar elements, features and structures.

DETAILED DESCRIPTION OF THE INVENTION

Figure 1:
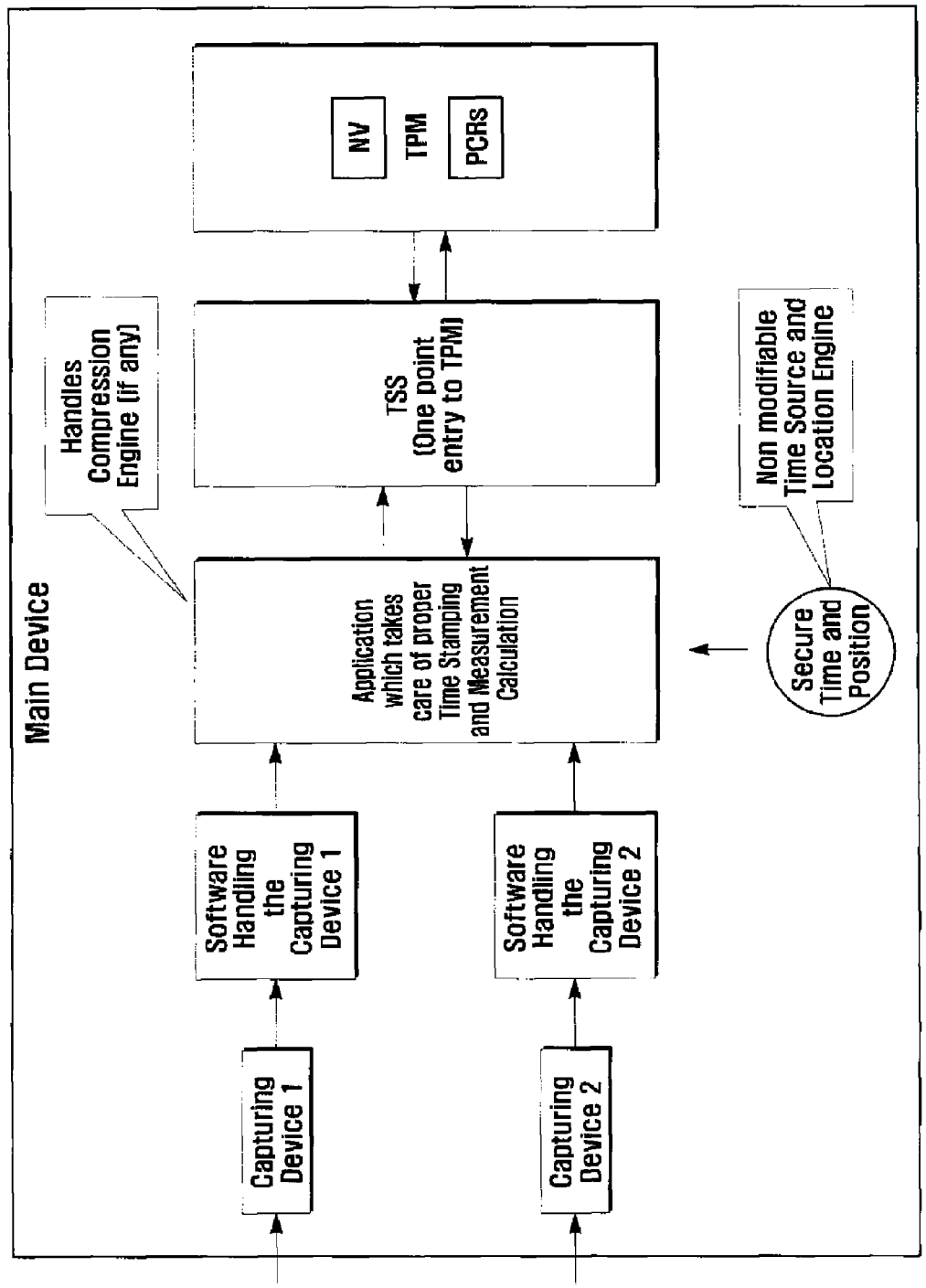
FIG. 1 illustrates the basic structure of the main device and the peripheral devices along with the proposed application.

This invention aims to make use of the basic Trusted Computing principles to build an application that securely captures data using peripheral devices residing on a main device. Trust Computing principles are well-known in the art and need not be discussed herein.

The captured data is stored after certain processing such that if the data is modified, then it can be proved that the data was tampered. If the data is not tampered, then it can be proved that the data is un-tampered. Using some computation along with TCG principles, it can be proved that the platform was stable at the capturing time also. The invention basically deals with captured data and not copied data.

Before describing details of testifying the authenticity of the digital data, terms used for the present invention are defined below.

Peripheral devices: Devices such as Camera, Voice Recorder, co processors.

Main Device: An entity such as a Mobile Phone, PDA etc on which other (peripheral) devices can reside.

TCG: Trusted Computing Group.

TPM: Trusted Platform Module

TSS: Trusted Software Stack

Trust: Behaving the way it is intended to behave.

PCR: Platform Configuration Register. This is volatile memory inside the TPM.

NV Memory: A small non volatile section of memory on the TPM chip.

CDAA: Captured Data Authenticity Application

Time-Space-Stamp: A measurement of the time and global co-ordinates during the data capturing.

GPS: Global Positioning System

Secure Boot: TCG mechanism of transitive trust propagation with proper measurement and storage.

Attestation: A TCG mechanism—a protocol between a verifier and a client to verify the platform configuration of the client.

Hash: One way irreversible function that takes input of variable size and gives input of fixed size.

SHA1: Secure Hash Algorithm

HMAC: Keyed—Hash Message Authentication Code.

SML: Security Measurement Log. This stores the System State at every Event. Event could be anything like an application getting executed, or some download happening etc.

PML: Peripheral Measurement Log. This is similar to the Storage Measurement Log of the TCG but has fewer fields.

DAA: Direct and Anonymous Attestation—TCG concept.

Actors:

Main Device—this is a device such as a Mobile, PDA etc on which capturing devices may reside.

Client—the main device is referred to as client when the verifier challenges it to prove the authenticity of its captured data.

Peripheral Devices—these are devices such as camera, sound recorder that exist on a main device. The document also interchangeably refers to them as capturing devices.

Verifier—A device belonging to the entity who wants to verify the authenticity of the data captured by the main device.

Trusted Third Party—An entity such as a Certificate Authority who is trusted by both the client and the verifier (This TTP is expected to not collude with either of the entities for accomplishing malice).

Trusted Platform Module—A small chip on the Client (and Verifier). It serves as the root of trust. This is a TCG specific term.

Trusted Software Stack—This is essentially a software stack built over the TPM. This serves as a one point entry to access the functionality of the TPM.

Captured Data Authenticity Application (CDAA)—this is the application built over the TSS which uses TPM to prove that the captured data was stored as is.

CDAA Manufacturer—this is a Trusted entity and could be the Platform Manufacturer itself.

Pre-Conditions:

The Client and the Verifier both have authentic TPM on their respective device.

The TPM has an Endorsement Key Certificate issued by the Device manufacturer, who is a trusted party.

Both Client and Verifier trust some Trusted Third Party such as a Privacy CA.

In accordance with the principles of the invention, the Main Device has been booted securely. This means that all the entities starting from the root of Trust (TPM), the Core Root of Trust for Measurement, the Boot Loader, the Operating System, the peripheral devices and the applications have booted after having been checked for integrity. This is a transitive trust mechanism where the entities are measured, authenticated and then executed. Since the root of trust lies in the hardware, it is assumed that it is virtually infeasible to tamper it. Once the Main device has booted up, the device configuration would have been measured i.e. any challenger having a list of the correct measurements can easily detect whether a client is in stable state.

Figure 2:
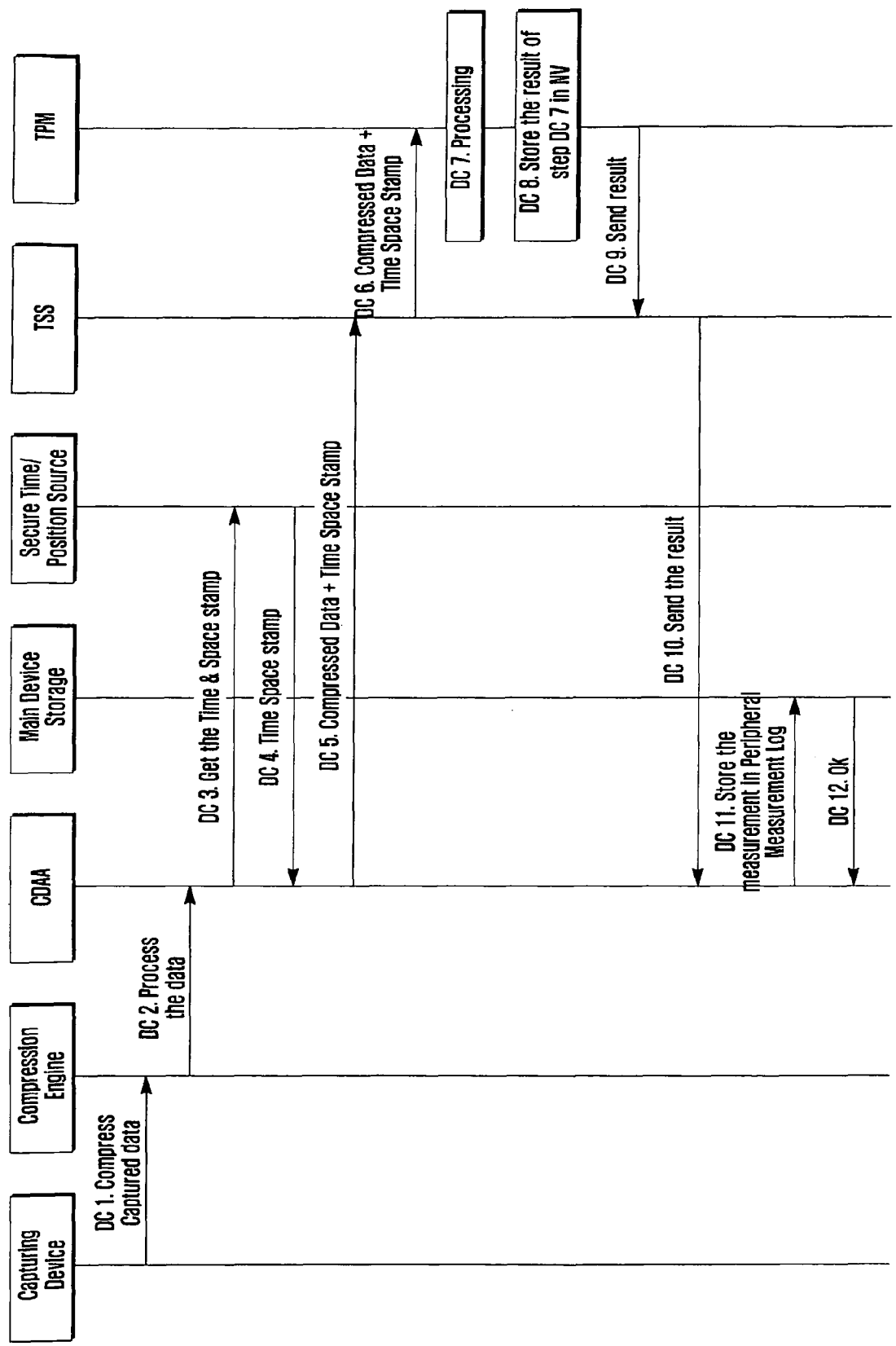
FIG. 2 illustrates a sequence chart of the steps carried out during the capture of the data using a peripheral device.

It is assumed that measurements for Genuine/authentic platform entities are available to the verifier. This is a TCG assumption. A secure transport scheme is necessary for the verification protocol. The present invention is described in the steps below and shown in the accompanying figures. The idea presented is dealt in two scenarios—Capturing of data and Verification of captured data Capturing of Data: (Refer FIG. 2)

DC 1) The Peripheral device has captured raw data from an external source. It sends the captured raw data to the Encoding/Compression engine.

DC 2) The Encoding engine compresses the data to the desired format and hands it over to the authenticity part, CDAA for processing. The steps 3 onwards describe the processing of the data and storage.

DC 3) CDAA requests a Time and Location from the secure time source/location finding engine on the Main Device.

DC 4) Secure Clock sends the time stamp—the delay from the capture time is considered negligible. Location engine sends the global position coordinates and the CDAA creates a Time-Space-Stamp.

DC 5) CDAA sends the encoded data and the Time-Space-Stamp to the Trusted Software Stack (TSS).

DC 6) TSS forwards the Time-Space Stamp to the TPM which has the HMAC engine.

DC 7) The following sets are then performed;

I. TPM calculates the SHA1 of the compressed data.

$X$=SHA1(Compressed Data)

II. It then extracts the previous measurement value which is stored at a pre-defined address in the Non Volatile (NV) memory on the TPM. Starting value is assumed to be NULL.

Y=Previous Measurement=Content of Memory Address 'A' in NV

III. It then extracts the current PCR Value from the TPM. The same value is also present in the Security Measurement Log maintained by the TSS.

Z=Current PCR Value

IV. TPM then calculates the HMAC of the concatenation of Y, X and Z using the time-space stamp as the reproduction avoidance key for the encryption procedure.

$$M = HMAC_{Time\text{-}Space\text{-}Stamp}(Y\|Y\|Z)$$

= New Value to be stored at Address 'A'

DC 8) Store the value M in the Non Volatile memory region at the same address.
DC 9) Send the control back to TSS with the values X, M, Z and the Time Stamp.
DC 10) Send the control to the CDAA with the values X, M, Z and the Time Stamp.
DC 11) CDAA maintains the Peripheral Measurement Log on the local storage of the Main Device and writes the following values in the Log:
  'X'—The SHA1 ( ) of the compressed data
  'T'—The Time-Space-Stamp
  'M'—The new value of the Measurement
  'Z'—The PCR value at the time of measurement.

Measurements of the PML are calculated by steps as shown in Table 1. Table 1 illustrates the steps to calculate the measurements in the PML. An example of a format for the PML is illustrated in FIG. 4.

TABLE 1

The initial value is calculated as the concatenation of SHA1 of first data captured and NULL.
So in the above case:
X = SHA1 (DATA 0)     // DATA 0 = 1$^{st}$ captured Digital Data
  = 25347645348735...
Z = PCRValue     // PCRValue reflects System State at the instant DATA0 is captured
  = A\$@@@!2123eedf...
M = HMAC$_{1301200712:35:46+55E-45S}$ (NULL || X || Z)
// HMAC$_{T\text{-}S\ Stamp}$(NULL concatenated with X and Z)
  = ABBB675434399CD....
--------------
X = SHA1 (DATA 1)     // DATA 0 = 2$^{nd}$ captured Digital Data
  = 4786735BDADCF ...
Z = PCRValue     // PCRValue reflects System State at the instant DATA1 is captured
  = A\$@@@!2123eedf...
M = HMAC$_{19012007\ 15:34:11\ -45E+66N}$(ABBB675434399CD.... || X || Z)
  = 198F6A7888B78888....
--------------
X = SHA1 (DATA 2)
  = 213043B34A3328...
Z = PCRValue
  = 1`00/@!2123eedf...
M = HMAC$_{3101200701:56:32-01E+70N}$(198F6A7888B78888... || X || Z)
  = 667FFBCA88342452....

DC 12) Send the result to the CDAA. Note that, in step DC11, the 'result' means the storage result after Main Device Storage stores the measurement as the request of CDAA.

When the next data is captured, the value M calculated above is treated as Y. The Measurement M is the only thing stored in the NV of the TPM since the TPM has limited storage space. The PML and SML are stored on the local storage of the capturing device. These can be modified by anyone, but the nature of the computations is such that the modifications will be detected during verification stage. The correlation of the Measurement with the PCR value is necessary to establish the platform stage at the time of capturing the data. A verifier can use the SML and the PML to arrive at the same measurement provided by the capturing device.

Figure 3A:
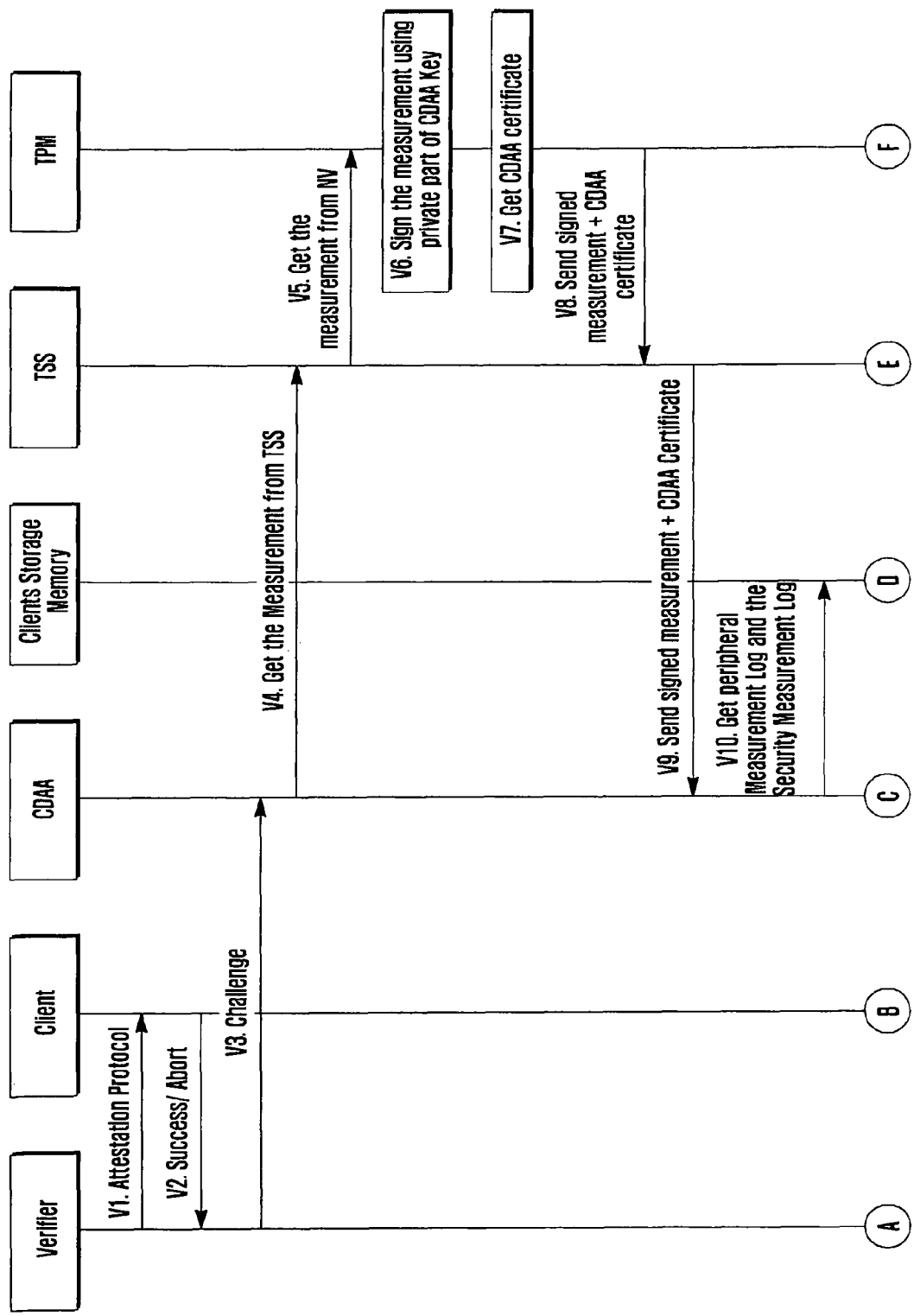
FIG. 3 illustrates a sequence diagram of the verification protocol.
Figure 3B:
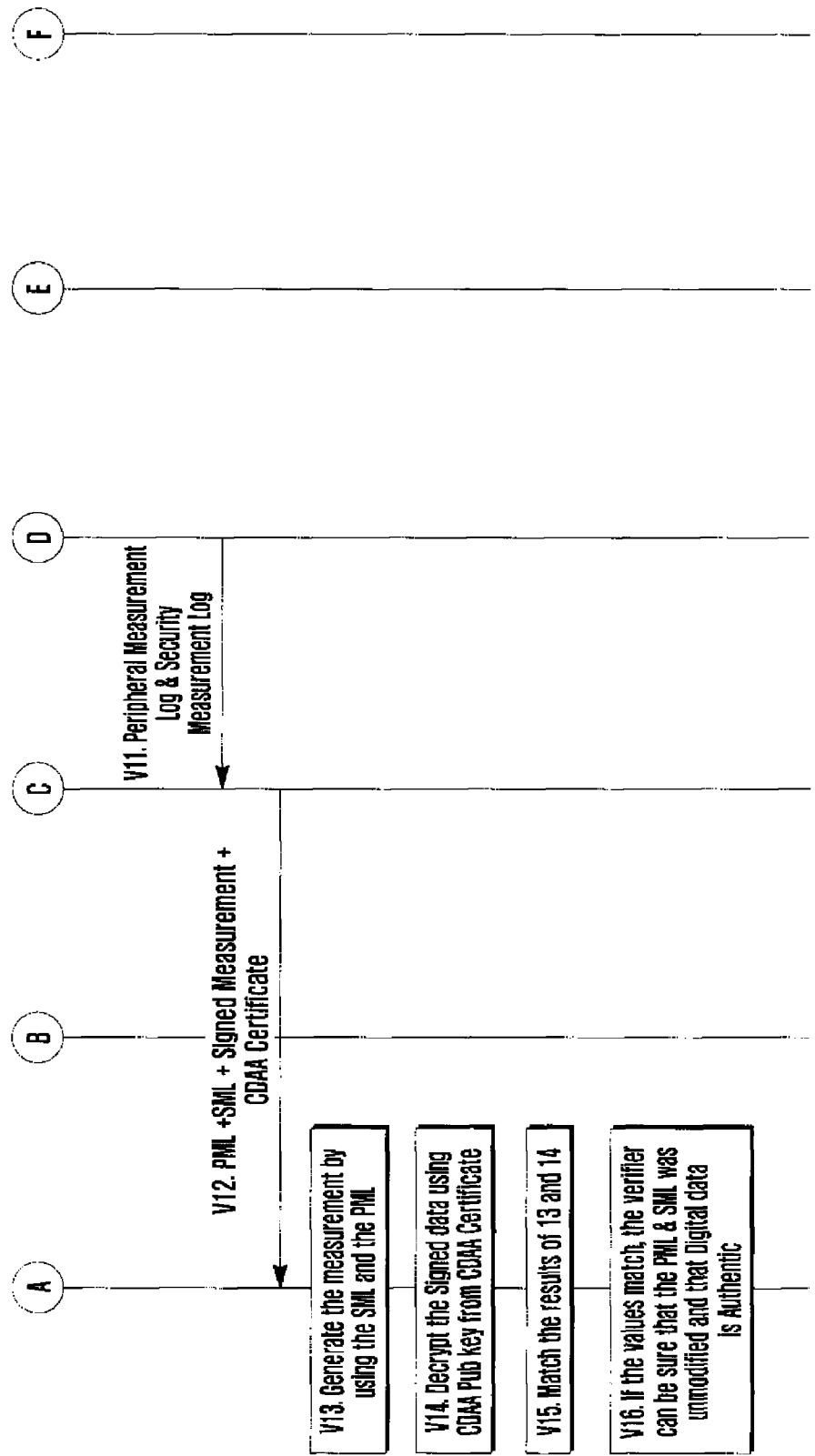

Verification of Captured Data. (Refer FIGS. 3A and 3B)

When the verifier wants to ascertain the credibility and authenticity of the digital evidence that the client has provided the following steps are performed.

V 1) The verifier initiates a basic attestation protocol using which he can ascertain the credibility of the client's platform. The attestation platform can remotely prove to a verifier that the client is running a secure platform (TPM, BIOS, OS, peripherals, applications). If the client does not wish to reveal his identity, then he can choose the Direct and Anonymous Attestation (DAA) method. DAA proves to the Verifier that he is communicating with a TPM—but does not reveal the identity of the TPM.

V 2) If the verifier is satisfied about the platform of the client, the verifier continues the protocol as described below. Else it is assumed that since the platform of the client is not stable, the data captured also cannot be expected to be authentic.

V 3) Verifier challenges the CDAA to prove the authenticity of the data captured.

V 4) The CDAA requests the TSS to provide the signed measurement.

V 5 TSS requests the TPM to obtain the measurement.

V 6 TPM fetches the measurement 'M' from the memory location 'A' discussed above. In one aspect, the CDAA has a RSA key pair and a certificate given by the CDAA Manufacturer, who is assumed to be trusted. The TPM uses the private part of this CDAA key and signs the Measurement 'M'. Signing is not mandatory but gives an added level of assurance to the verifier that the measurement originated from a TPM with an authentic CDAA.

V 7 TPM fetches the CDAA certificate from its Database in the NV.

V 8 TPM sends the signed measurement and CDAA certificate to the TSS.

V 9 TSS passes the signed measurement to the CDAA.

V 10 CDAA requests for the Peripheral Measurement Log and Security Measurement Log from the Local Storage Memory.

V 11 CDAA receives the PML.

V 12 CDAA sends the PML, the signed measurement, the SML and the CDAA certificate to the verifier. The data claimed to be the evidence can be sent to the verifier as a part of this step or can be sent via other means. This method does not pose any restrictions on the exact instance of sending the captured data.

V 13 Verifier calculates Measurement 'M' using the received PML, and SML and checks whether the PML and/or SML were tampered. The verifier also needs to verify the CDAA certificate from a Trusted Third Party. As the same CDAA has been used for attestation protocol in step 1 and 2, the verifier can decide whether it can be from a trusted device) The verifier can alternatively verify the CDAA certificate from some TTP. To verify that the Capturer's platform was stable at capture time, the verifier needs to use the SML and arrive at the PCR value used for the PML measurement calculation. The method used is the same as that used in the Quote process described by TCG. If the PCR values in the PML do not exist in the SML, it denotes that either the PML or SML has been modified. If the PCR value does not match, it means that the SML has been modified or the platform is not stable. Only a stable platform can reproduce the exact measurement values. The verifier uses the PML and repeats the entire procedure shown in FIGS. 3A and 3B until he comes up with a final measurement.

V 14 The verifier decrypts the signed measurement with the public key of the CDAA to get the value of the unsigned measurement.

V 15 The verifier compares the values of measurements of the steps 13 and 14.

V 16 If they match then the verifier can be sure that the data captured has not been modified or tampered.

To avoid the possibility of a runtime attack, in one aspect of the invention, the Verifier repeats Steps V1 and V2 again at the end of the Verification Protocol. This will prove that the Client platform was stable throughout the Verification Protocol.

Mechanism for Hidden Witness:

When the client does not intend to reveal his identity to the Verifier, i.e., client wants to act as a hidden witness, the steps to be followed are described below.

The procedure is similar to the verification scenario described but with the following differences:

Trusted Application—is an application that can be downloaded from a "trusted" website belonging to the appropriate authorities, e.g., a court. Fake applications can be detected during the attestation process. This Trusted Application will reside in the client's mobile. This application will initiate secure communication as well as process and send messages to and from the verifier. This application may be capable of accepting input from the client, displaying information or error messages to the client as well as communicating with the TPM.

Trusted Website—is a website that will display brief description of the cases along with the case numbers so that any one can present their digital proofs remotely and anonymously.

Figure 5A:
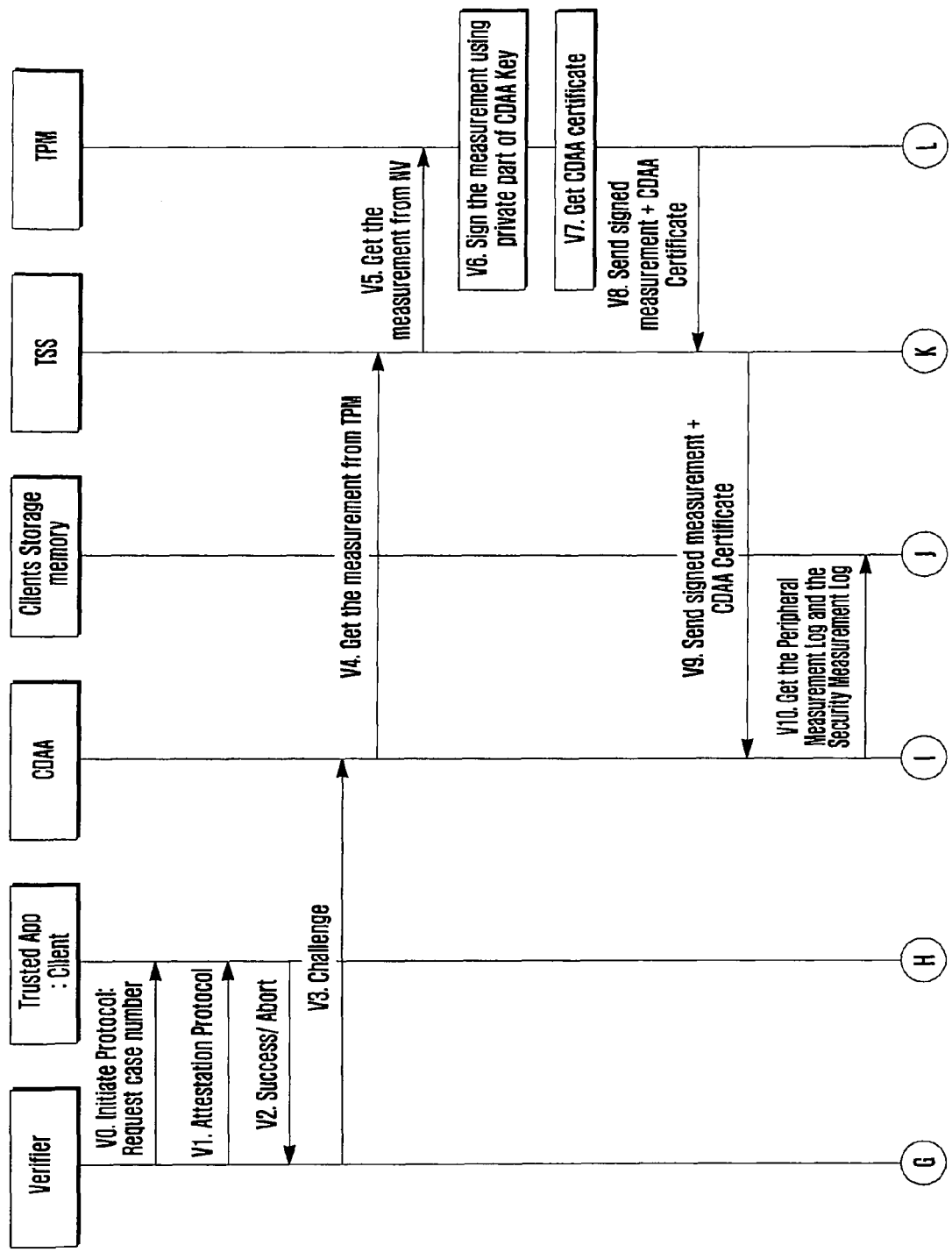
FIG. 5 illustrates the steps involved in anonymously testifying the authenticity of Digital Data.

Verification of Captured Data: (Refer FIGS. 5A and 5B)

To ascertain the credibility and authenticity of the digital data that the client has provided the Verifier performs the following steps:

V0) The Trusted Application initiates the verification protocol by sending a request to the verifier along with the case number.

V 1) The verifier carries out a basic attestation protocol through which he can ascertain the credibility of the client's platform. The attestation platform can remotely prove to a verifier that the client is running a secure platform (TPM, BIOS, OS, peripherals, applications). If the client does not wish to reveal his identity, then he can choose the Direct and Anonymous Attestation (DAA) method. DAA proves to the Verifier that he is communicating with a TPM—but does not reveal the identity of the TPM.

V 2) If the verifier is satisfied about the platform of the client, he continues the protocol as mentioned below. Else it is assumed that since the platform of the client is not stable, the data captured by him also cannot be expected to be authentic.

V 3) Verifier challenges the CDAA to prove the authenticity of the data captured.

V 4) The CDAA requests the TSS to obtain the signed measurement.

V 5) TSS requests the TPM to obtain the measurement.

V 6) TPM fetches the measurement 'M' from the memory location 'A' as discussed above. It is assumed that the CDAA has a RSA key pair and a certificate given by the CDAA Manufacturer, who is assumed to be trusted. The TPM uses the private part of this CDAA key and signs the Measurement 'M'. Signing is not mandatory but gives an added level of assurance to the verifier that the measurement originated from a TPM with an authentic CDAA.

V 7) TPM fetches the CDAA certificate from its Database in NV.

V 8) TPM sends signed measurement and CDAA certificate to TSS.

V 9) TSS passes the same to the CDAA.

V 10) CDAA makes a request for the Peripheral Measurement Log and Security Measurement Log from the Local Storage Memory.

V 11) CDAA receives the PML.

V 12) CDAA sends the PML, the signed measurement and the CDAA certificate to the verifier. The data claimed to be the evidence can then be sent to the Verifier as a part of this step or can be sent via other means. This method does not pose any restrictions on the exact instance of sending the captured data.

V 13) Verifier calculates Measurement 'M' using the received PML, and SML. The Verifier checks whether the PML and/or SML were tampered. The Verifier also needs to verify the CDAA certificate from a Trusted Third Party. Since the same CDAA has been used for attestation protocol in step 1 and 2, the Verifier can decide on whether the device is a trusted device. The Verifier can alternatively verify the CDAA certificate from some TTP. To verify that the Capturer's platform was stable at capture time, the Verifier uses the SML and determines the PCR value used for the PML measurement calculation. The method used is the same as in the Quote process described by TCG. If the PCR values in the PML do not exist in the SML, it denotes that either the PML or SML has been modified. If the arrived at PCR value doesn't match, it means that the SML has been modified or the platform is not stable. Only a stable platform can reproduce the exact measurement values. The verifier uses the PML and repeats the entire procedure shown in FIGS. 5A and 5B until a final measurement is obtained.

V 14) The verifier decrypts the signed measurement with the public key of the CDAA to get the value of the unsigned measurement.

V 15) The verifier compares the values measurements of the steps 13 and 14.

V 16) If they match then the verifier can be sure that the data captured has not been modified or tampered.

To avoid the possibility of a runtime attack, in another aspect of the invention, the Verifier executes Step V1 and V2 again at the end of the Verification Protocol. This will prove that the Client platform was stable throughout the Verification Protocol.

Mechanism to Verify and Host Content:

As discussed previously, Digital Content is in great demand today. Content Vendors can use a minor variation of this invention to ascertain the authenticity of digital content before accepting and hosting content from individuals.

Example, "YouTube," or other similar websites, is a Host for various digital data uploaded by people. There is no proof of the authenticity of the content uploaded to "YouTube". In accordance with the principles of the invention, such websites can claim that a certain Digital data is authentic to anyone who wants to confirm its authenticity.

A Trusted entity can act as a Verification Agency that can certify that Digital Data from Individuals. Certification of the Digital Data is the same as signing the one way representation (hash) of the digital content with the Private Key of the Verifier after the verification has been found to be correct. Digital Content can carry a certification by the Verifier Entity.

Thus, anyone wishing to find out whether the data is authentic and un-tampered can do so by checking the Certification on the Data using the Public Key Certificate of the Verifier.

The method described, herein, enhances the authenticity of the digital data by using the TCG principles. Once captured data is presented as evidence, it is impossible to falsify the evidence since it is backed up by a strong hardware root of trust.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for verifying the authenticity of digital data comprising:
   extracting reproduction avoidance key information and log information for captured data from stored information if verification for the captured data is requested, wherein the reproduction avoidance key information comprises a time and space (TS) stamp at data capturing time, and is calculated using one way keyed hash function;
   calculating reproduction avoidance key information using the extracted log information, wherein the reproduction avoidance key information is a keyed hash message authentication code (HMAC) including the TS stamp;
   comparing the extracted reproduction avoidance key information with the calculated reproduction avoidance key information; and
   determining that the captured data has not been tampered, if the reproduction avoidance key informations are matched;
   wherein the keyed hash message authentication code (HMAC) is calculated by M =HMAC (Y II X II Z) and wherein the value M is a measurement value, the value Y is a previous measurement value, the value X is a secure hash algorithm (SHA1) of compressed data, the value Z is a current PCR value, and Y II X II Z is concatenation of Y, X and Z.

2. The method of claim 1, wherein the log information comprises Peripheral Measurement Log (PML) and Secured Measurement Log (SML).

3. The method of claim 2, wherein the PML comprises the values X, M, Z, and the TS stamp.

4. The method of claim 3, further comprising,
   comparing a PCR value included in the PML with a PCR value included in SML; and
   determining that attestation platform is stable if the PCR values are matched.

5. The method of claim 1, further comprising,
   obtaining the TS stamp for the captured data when the digital data is captured; and
   calculating the reproduction avoidance key information using the TS stamp for the captured data and storing the reproduction avoidance key information in a trusted platform module(TPM) and memory.

6. The method of claim 1, further comprising signing the extracted reproduction avoidance key information using an authenticity certificate.

7. An apparatus for verifying the authenticity of digital data, comprising:
   an authenticity part for obtaining reproduction avoidance key information and log information for captured data if verification for the captured data is requested;
   a trusted platform module (TPM) for calculating the reproduction avoidance key information using a time and space (TS) stamp and storing the calculated information;
   a memory for storing the log information; and
   a verifier for requesting verification for the captured data, calculating the reproduction avoidance key information using the log information when the reproduction avoidance key information and the log information are received from the authenticity part, comparing the received reproduction avoidance key information with the calculated reproduction avoidance key information, and determining that the captured data has not been tampered, if the reproduction avoidance key informations are matched;
   a capturing device for capturing the digital data; and\
   time and space engines for providing the TS stamp at data capturing time;
   wherein the TPM comprises a hash message authentication code (HMAC) engine, and calculates a keyed HMAC using the TS stamp by M=HMAC (Y II X II Z), and wherein the value M is a measurement value, the value X is a secure hash algorithm (SHA1) of compressed data, the value Y is a previous measurement value, the value Z is a current PCR value, and Y I[ X II Z is concatenation of the values Y, X and Z.

8. The apparatus of claim 7 wherein the log information comprises Peripheral Measurement Log (PML) and Secured Measurement Log (SML).

9. The apparatus of claim 8, wherein the PML comprises the values X, M, Z, and the TS stamp.

10. The apparatus of claim 9, wherein the verifier compares a PCR value included in the PML with a PCR value included in SML, and determines that attestation platform is stable if the PCR values are matched.

11. The apparatus of claim 10, wherein the TPM signs the calculated reproduction avoidance key information using an authenticity certificate.

12. The apparatus of claim 11, wherein the authenticity part comprises a Captured Data Authenticity Application (CDAA).

13. The apparatus of claim 12, wherein the captured data is verified as a hidden witness which does not reveal identity of the TPM to the verifier.

* * * * *